Sept. 16, 1958
E. R. BROWN
2,852,154
ROTARY SHAFT ACTUATED APPARATUS
Original Filed May 28, 1954
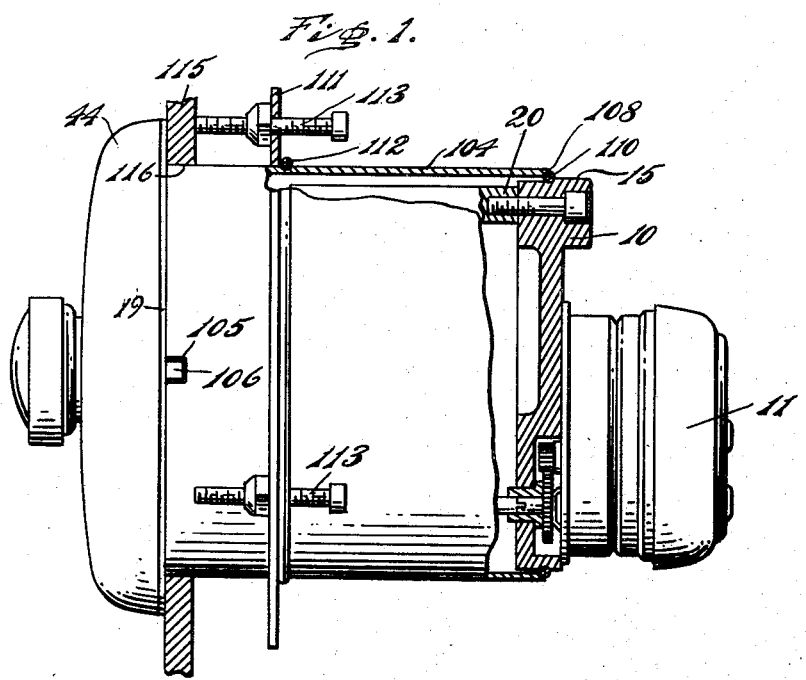
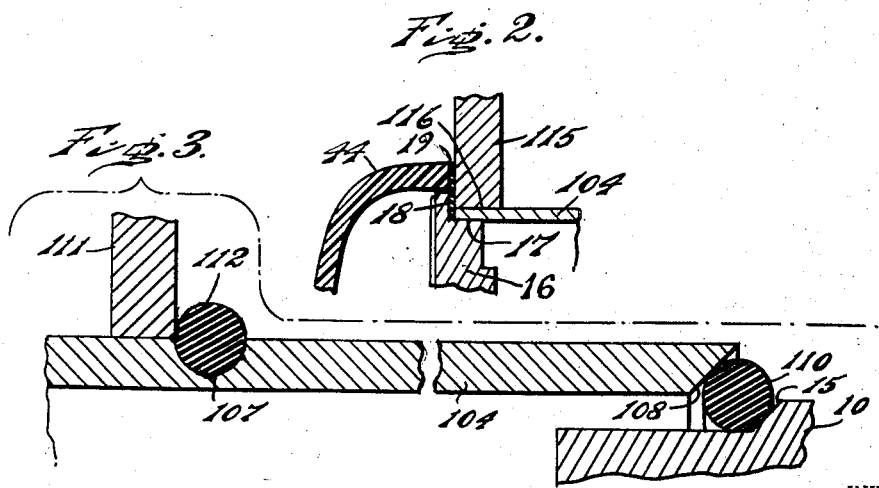
INVENTOR.
Everett R. Brown
BY Frank H. Borden
ATTORNEY

United States Patent Office 2,852,154
Patented Sept. 16, 1958

2,852,154

ROTARY SHAFT ACTUATED APPARATUS

Everett R. Brown, Warrington, Pa., assignor to Automatic Timing & Controls, Inc., a corporation of Pennsylvania Original application May 28, 1954, Serial No. 433,142. Divided and this application February 8, 1956, Serial No. 564,157

7 Claims. (Cl. 220—4)

This invention pertains to rotary shaft actuated apparatus and illustratively relates to timers.

It is among the objects of the invention to provide a simplified mounting and assembly organization for timers; to provide a timer organization in which a dust-tight housing assembly is effected in a novel gasket utilization to provide any of the foregoing objects in the broad field of rotary shaft actuated devices in which, although illustratively exemplified by timers, is attained in other devices such as revolution counters, impulse counters, and the like; and to provide other objects and advantages as will become more apparent as the description proceeds.

In the accompanying drawings, forming part of this description:

Fig. 1 represents an elevation, partially broken away of the timer, according to an illustrative embodiment thereof, as mounted in a panel, taken from application 433,142, filed May 28, 1954, of which this is a division.

Fig. 2 represents a fragmentary section through part of the timer showing details of the front end thereof.

Fig. 3 represents a fragmentary longitudinal section of Fig. 1 on an enlarged scale.

The timer is formed of a molded or cast rear plate 10. The molded rear plate is peripherally annular at its front end and has a peripherally continuous shallow shoulder 15 at about 45° to the central axis thereof toward its rear surface, to form one bearing and sealing surface for the locking and sealing O-ring to be described.

The timer has a cast annular front plate 16 of generally rounded square profile, the rearward face of which has a short annular wall 17 to be telescopically embraced by an enclosing sleeve or housing to be described, and has a rearwardly facing peripheral surface 18 of varying area peripherally about wall 17. A resilient compressible gasket 19 embraces annular portion 17 and extends radialy across the surface 18 for abutment against the front face of the mounting panel 115. The front and rear plates are connected by rods 20 or the like, suitably connected with the plates to establish a rigid assembly.

A front cover plate 44 is provided, comprising preferably a thermoplastic or like housing element generally a rounded square in profile to enclose cast front plate 16 and to impinge against the gasket 19.

In order to enclose the unit in a dust-tight assembly, while furnishing means to be described for locking the assembly in the mounting panel, a cylinder 104 is provided, having, if necessary, an indexing recess 105 on its forward end to match a complemental rearwardly projecting protuberance 106 on the front plate 16. The gasket 19 overlies the protuberance and enters the recess in which it is distorted and compressed. The cylinder 104 has a peripheral channel or groove 107, semi-cylindrical in cross section, at a desired space from the indexing end, and the rear end of the cylinder 104 is chamfered or bevelled as at 108, at 45° to the common axis of the timer. The cylinder 104 is slid axially over the timer into compressing impingement against the gasket 19, enclosing annular wall 17, with the bevelled rear edge 108 juxtaposed to the complementally bevelled rear edge 15, upon and between both of which the sealing and locking O ring 110 is mounted to prevent retraction of the cylinder axially of the timer assembly, while effecting a tight dust seal therefor. A metallic or rigid lock ring 111 of internal circumference just large enough to effect sliding fit over the cylinder 104 is pushed forwardly to a position ahead of the groove 107, and the O ring 112 is then mounted and seated in the groove 107. The locking studs 113, illustratively three in number are then forced forwardly of the ring parallel to the axis of the timer to abut against the rear or inner face of the mounting panel 115, in aperture 116 of which the timer is mounted.

The generally cylindrical timer has the sleeve 104 sealed on by the rear O ring organization 110. The metal ring 111 and the gripping O ring 112 are removed and the timer is slid rearwardly through the aperture 116 of the mounting panel, until the rear gasket 19 of the front plate abuts the panel. The mounting ring has the studs 113 retracted and is slid over the cylindrical sleeve 104 to a position between the panel and the peripheral groove 107. The O ring 112 is then slid over the rear end of the timer and seated in the peripheral groove 107. The studs 113 are then advanced against the panel, forcing the mounting ring rearwardly against the O ring 112, and firmly anchoring the timer in its seated panel position.

It will be clear that many modifications and alternative structures may be provided in exemplifying the invention, without departing from the spirit thereof. For instance, it will be seen that although it is preferred to provide the respective O rings as resilient non-metallic devices, within the broader aspects of the invention, one or more thereof may be metallic and may not need to be resilient in cross section.

The novel features of the invention are available for use in any organization in which the rotations or oscillations of a shaft can be used to drive mechanism, and, although for simplicity and purposes of exposition, it has been described as particularly used in a time-controlled shaft actuation, the invention is not so limited, and the attached claims are to be construed according to the specific limitations therein and not as being limited to a timer only.

Having thus described my invention, I claim:

1. A timer or the like for mounting in a panel having an aperture, comprising an annular rear plate, a front plate having an annular portion and a portion of greater diameter than said annular portion and disposed to seat its said annular surface in said aperture and with its portion of greater diameter substantially against the face of such panel, said timer further comprising a cylindrical open-ended separate enclosing housing having a peripheral semi-circular groove, a rigid mounting ring slidable on said cylindrical housing, expansible means between said ring and such panel to force the ring rearwardly, and a resilient member seated in said peripheral groove and engaged by said ring for holding the portion of greater diameter of said front plate substantially against said panel when the expansible means are extended.

2. A timer or the like for mounting in a panel having an aperture, comprising an annular rear plate, a front plate having an annular portion and disposed to seat in said aperture and including a portion for substantial abutment against the front face of such panel, said timer comprising an axially removable enclosing cylindrical housing having an inwardly forwardly sloping rear end surface, said housing having an external peripheral groove, said rear plate having an inwardly forwardly sloping peripheral surface, a removable resilient ring disposed between the respective surfaces so as to yieldingly hold the housing against retraction over said annular rear plate, a rigid ring slidable over said housing, expansible means mounted on said ring and extended toward such panel, a resilient member seated in said peripheral groove between said ring and said removable resilient ring and engaged by said rigid ring when the expansible means extends to abut and engage the inner face of such panel to mount the timer in cushioned firm contact in and against such panel.

3. A timer or the like for mounting in a panel having an aperture, comprising a front plate having an annular portion and an abutment portion substantially normal to the annular portion, an annular rear plate of the same diameter as the annular portion of the front plate, a resilient gasket surrounding the annular portion of said front plate in substantially parallel impingement against said abutment portion, an axially removable enclosing housing of such diameter as to slide axially over both said annular plate and portion to impingement against said gasket, said housing and rear plate having complemental ring engaging surfaces, said housing having an external peripheral groove, a removable resilient ring disposed between said complemental surfaces to prevent axial retraction of said housing over said rear plate, said plates and housing being insertable into said aperture, a rigid ring slidable over said housing toward said front plate beyond said groove, expansible means mounted on said rigid ring and extensible toward such panel, a resilient ring member seated in said peripheral groove and engaged by said rigid ring when the expansible means extends to abut and engage the inner face of such panel to force the housing rearwardly in compression of said removable resilient ring and to pull said abutment portion and resilient gasket into firm cushioned contact against such panel.

4. In a device of the class described, an assembly having a longitudinal axis and comprising front and rear elements in fixed axial relation, said rear element having an annular portion of known maximum external diameter, said rear element incorporating a ring-engaging surface at least partially facing toward said front element, said front element incorporating a larger portion which is larger than said maximum diameter, an enclosing open-ended cylinder having front and rear ends and an internal diameter smaller than said larger portion and larger than said maximum diameter so that it is slidable forwardly over said annular portion from the rear only to substantial abutment of its front end against said larger portion, said enclosing cylinder being of predetermined length such that with its front end substantially abutting said larger portion its rear end is in spaced juxtaposition to said ring-engaging surface, and a resilient ring member disposed between said rear end and said ring-engaging surface anchoring said cylinder against rearward retraction over said annular portion, while permitting same upon removal of said resilient ring.

5. A device as described in claim 4, in which the said front element also incorporates an annular portion of substantially the same diameter as the said maximum diameter of the annular portion of said rear element to receive and support the front end of said cylinder.

6. A device as described in claim 4, and resilient means engaged between said larger portion and the front end of said cylinder for sealing and under compression for exerting axial force on said cylinder toward closing the space containing said resilient ring to compress the latter to enhance sealing.

7. A device as in claim 4, and resilient means engaged between said larger portion and said front end of said cylinder for sealing and for exerting pressure against said resilient ring to seal said rear end of said cylinder.

References Cited in the file of this patent

UNITED STATES PATENTS

| 228,696 | Thompson | June 8, 1880 |
| 2,116,154 | Lamb | May 3, 1938 |
| 2,116,421 | Williams | May 3, 1938 |
| 2,121,511 | Schlesinger | June 21, 1938 |
| 2,364,617 | Bolser | Dec. 12, 1944 |
| 2,639,598 | McCracken | May 26, 1953 |
| 2,701,659 | Baltosser | Feb. 8, 1955 |
| 2,736,083 | Rogers | Feb. 26, 1956 |

FOREIGN PATENTS

| 501,220 | Germany | Nov. 20, 1929 |